United States Patent
Chao

(10) Patent No.: US 8,364,392 B2
(45) Date of Patent: Jan. 29, 2013

(54) NAVIGATION SYSTEM WITH SPEED MONITORING MECHANISM AND METHOD OF OPERATION THEREOF

(75) Inventor: Yi-Chung Chao, San Jose, CA (US)

(73) Assignee: Telenav, Inc., Sunnyvale, CA (US)

( * ) Notice: Subject to any disclaimer, the term of this patent is extended or adjusted under 35 U.S.C. 154(b) by 466 days.

(21) Appl. No.: 12/649,323

(22) Filed: Dec. 29, 2009

(65) Prior Publication Data

US 2011/0161004 A1    Jun. 30, 2011

(51) Int. Cl.
*G01C 21/26* (2006.01)
*G06F 19/00* (2006.01)

(52) U.S. Cl. .................... 701/408; 701/428; 340/441

(58) Field of Classification Search .................. 701/408, 701/532, 93, 96, 117, 428, 301; 340/905, 340/441
See application file for complete search history.

(56) References Cited

U.S. PATENT DOCUMENTS

| | | | |
|---|---|---|---|
| 4,631,513 A * | 12/1986 | Teshima et al. | 340/441 |
| 5,755,620 A | 5/1998 | Yamamoto et al. | |
| 5,771,484 A * | 6/1998 | Tognazzini | 701/117 |
| 6,265,989 B1 | 7/2001 | Taylor | |
| 6,459,365 B2 | 10/2002 | Tamura | |
| 6,515,596 B2 * | 2/2003 | Awada | 340/905 |
| 6,567,728 B1 * | 5/2003 | Kelly et al. | 701/9 |
| 6,778,074 B1 * | 8/2004 | Cuozzo | 340/441 |
| 7,589,643 B2 * | 9/2009 | Dagci et al. | 340/905 |
| 2005/0060069 A1 | 3/2005 | Breed et al. | |
| 2006/0111836 A1 | 5/2006 | Fast et al. | |
| 2006/0293856 A1 | 12/2006 | Foessel et al. | |
| 2008/0051971 A1 * | 2/2008 | Sung | 701/93 |
| 2008/0215238 A1 * | 9/2008 | Geelen et al. | 701/210 |
| 2009/0005961 A1 | 1/2009 | Grabowski et al. | |

OTHER PUBLICATIONS

International Search Report for Application No. PCT/US2010/061668 dated Feb. 24, 2011.

* cited by examiner

*Primary Examiner* — Tan Q Nguyen

(57) ABSTRACT

A method of operation of a navigation system includes: calculating a safe speed for a travel path; calculating a user's speed along the travel path; and calculating a difference value between the user's speed and the safe speed for displaying on a device.

18 Claims, 6 Drawing Sheets

NAVIGATION SYSTEM WITH SPEED MONITORING MECHANISM AND METHOD OF OPERATION THEREOF

TECHNICAL FIELD

The present invention relates generally to a navigation system, and more particularly to a system for a navigation system with speed monitoring.

BACKGROUND ART

Modern portable consumer and industrial electronics, especially client devices such as navigation systems, cellular phones, portable digital assistants, and combination devices, are providing increasing levels of functionality to support modern life including location-based information services. Numerous technologies have been developed to utilize this new functionality.

In our increasingly mobile society, users will frequently enter into areas where they are unfamiliar with speed limits or safety concerns. There are many technological solutions to take advantage of this new device location opportunity. Research and development in existing technologies can take many different directions. One existing approach is to use location-based services to provide a device with up-to-date speed limit information that can be used to warn the user of excess speed.

Excess speed alarms can take any number of forms in electronic devices, and provide a valuable service to drivers who already have too many things to worry about on the road. However, the alarms lack features that would help a user maintain a proper safe speed.

Thus, a need still remains for a navigation system that does more than simply warn a driver once they have exceeded a speed limit or safe speed. In view of the increasing traffic problem and subsequent increase in accidents, the ever-increasing commercial competitive pressures, along with growing consumer expectations and the diminishing opportunities for meaningful product differentiation in the marketplace, it is critical that answers be found for these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

DISCLOSURE OF THE INVENTION

The present invention provides a method of operation of a navigation system including: calculating a safe speed for a travel path; calculating a user's speed along the travel path; and calculating a difference value between the user's speed and the safe speed for displaying on a device.

The present invention provides a navigation system, including: a safe speed module for calculating a safe speed for a travel path; a user's speed module, coupled to the safe speed module, for calculating a user's speed along the travel path; a difference module, coupled to the safe speed module, for calculating a difference value between the safe speed and the user's speed; and a display module, coupled to the difference module, for depicting the difference value.

Certain embodiments of the invention have other steps or elements in addition to or in place of those mentioned above. The steps or elements will become apparent to those skilled in the art from a reading of the following detailed description when taken with reference to the accompanying drawings.

BEST MODE FOR CARRYING OUT THE INVENTION

Figure 1:
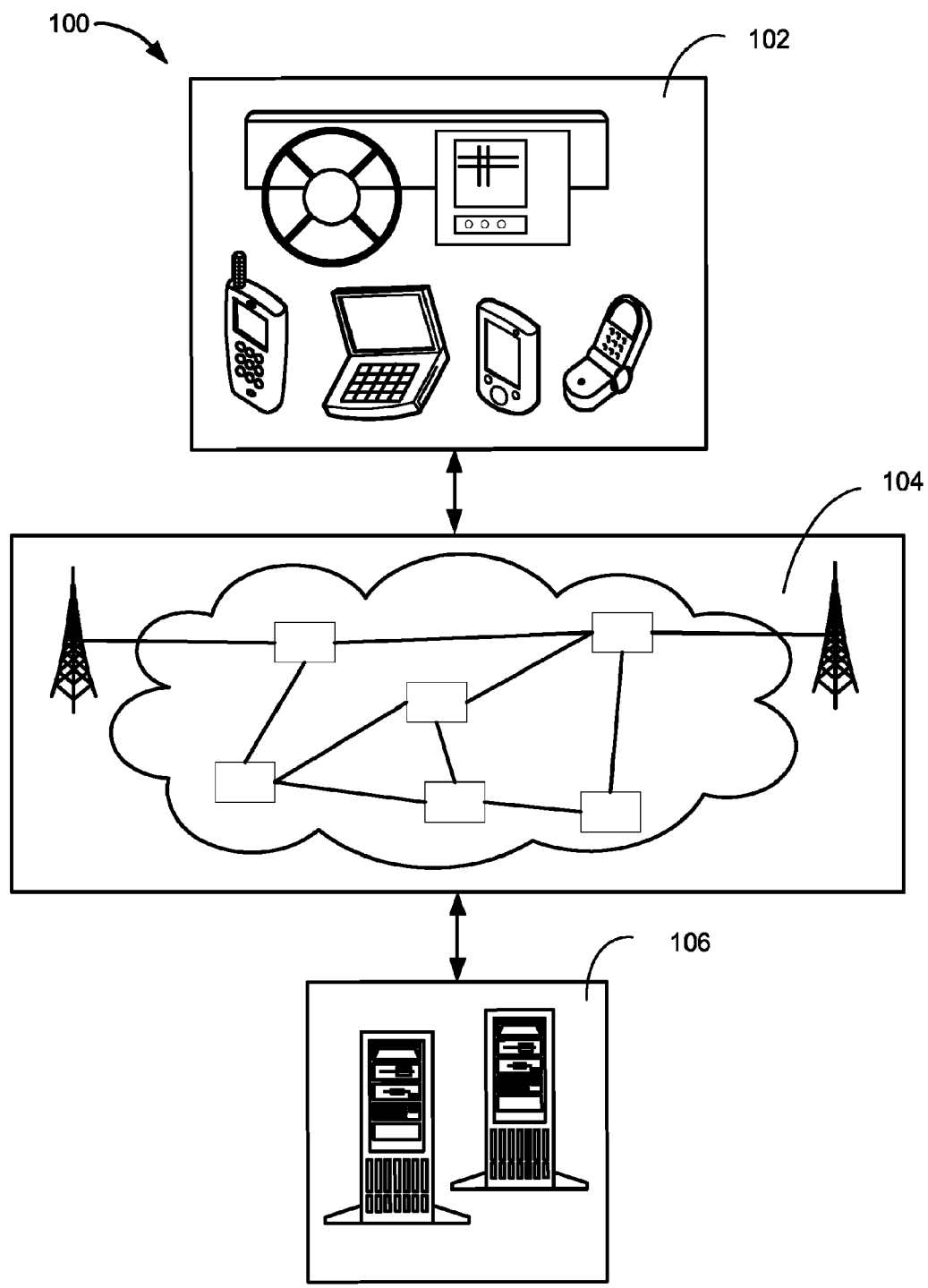
FIG. 1 is a navigation system with speed monitoring mechanism in a first embodiment of the present invention.

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

The drawings showing embodiments of the system are semi-diagrammatic and not to scale and, particularly, some of the dimensions are for the clarity of presentation and are shown exaggerated in the drawing FIGs. Similarly, although the views in the drawings for ease of description generally show similar orientations, this depiction in the FIGs. is arbitrary for the most part. Generally, the invention can be operated in any orientation. The embodiments have been numbered first embodiment, second embodiment, etc. as a matter of descriptive convenience and are not intended to have any other significance or provide limitations for the present invention.

One skilled in the art would appreciate that the format with which navigation information is expressed is not critical to some embodiments of the invention. For example, in some embodiments, navigation information is presented in the format of (X, Y), where X and Y are two ordinates that define the geographic location, i.e., a position of a user.

In an alternative embodiment, navigation information is presented by longitude and latitude related information. In a further embodiment of the present invention, the navigation information also includes a velocity element comprising a speed component and a heading component.

The term "relevant information" referred to herein comprises the navigation information described as well as information relating to points of interest to the user, such as local business, hours of businesses, types of businesses, advertised specials, traffic information, maps, local events, and nearby community or personal information.

The term "module" referred to herein can include software, hardware, or a combination thereof. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof.

Referring now to FIG. 1, therein is shown a navigation system 100 with speed monitoring mechanism in a first embodiment of the present invention. The navigation system 100 includes a first device 102, such as a client or a server, connected to a second device 106, such as a client or server, with a communication path 104, such as a wireless or wired network.

For example, the first device 102 can be of any of a variety of mobile devices, such as a cellular phone, personal digital assistant, a notebook computer, automotive telematic navigation system, or other multi-functional mobile communication or entertainment device. The first device 102 can be a standalone device, or can be incorporated with a vehicle, for example a car, truck, bus, or train. The first device 102 can couple to the communication path 104 to communicate with the second device 106.

For illustrative purposes, the navigation system 100 is described with the first device 102 as a mobile computing device, although it is understood that the first device 102 can be different types of computing devices. For example, the first device 102 can also be a non-mobile computing device, such as a server, a server farm, or a desktop computer.

The communication path 104 can be a variety of networks. For example, the communication path 104 can include wireless communication, wired communication, optical, ultrasonic, or the combination thereof. Satellite communication, cellular communication, Bluetooth, Infrared Data Association standard (IrDA), wireless fidelity (WiFi), and worldwide interoperability for microwave access (WiMAX) are examples of wireless communication that can be included in the communication path 104. Ethernet, digital subscriber line (DSL), fiber to the home (FTTH), and plain old telephone service (POTS) are examples of wired communication that can be included in the communication path 104.

Further, the communication path 104 can traverse a number of network topologies and distances. For example, the communication path 104 can include direct connection, personal area network (PAN), local area network (LAN), metropolitan area network (MAN), wide area network (WAN) or any combination thereof.

The second device 106 can be any of a variety of centralized or decentralized computing devices. For example, the second device 106 can be a computer, grid computing resources, a virtualized computer resource, cloud computing resource, routers, switches, peer-to-peer distributed computing devices, or a combination thereof.

The second device 106 can be centralized in a single computer room, distributed across different rooms, distributed across different geographical locations, embedded within a telecommunications network. The second device 106 can have a means for coupling with the communication path 104 to communicate with the first device 102. The second device 106 can also be a client type device as described for the first device 102.

In another example, the first device 102 can be a particularized machine, such as a mainframe, a server, a cluster server, rack mounted server, or a blade server, or as more specific examples, an IBM System z10™ Business Class mainframe or a HP ProLiant ML™ server. Yet another example, the second device 106 can be a particularized machine, such as a portable computing device, a thin client, a notebook, a netbook, a smartphone, personal digital assistant, or a cellular phone, and as specific examples, an Apple iPhone™, Palm Centro™, or Moto Q Global™.

For illustrative purposes, the navigation system 100 is described with the second device 106 as a non-mobile computing device, although it is understood that the second device 106 can be different types of computing devices. For example, the second device 106 can also be a mobile computing device, such as notebook computer, another client device, or a different type of client device. The second device 106 can be a standalone device, or can be incorporated with a vehicle, for example a car, truck, bus, or train.

Also for illustrative purposes, the navigation system 100 is shown with the second device 106 and the first device 102 as end points of the communication path 104, although it is understood that the navigation system 100 can have a different partition between the first device 102, the second device 106, and the communication path 104. For example, the first device 102, the second device 106, or a combination thereof can also function as part of the communication path 104.

Figure 2:
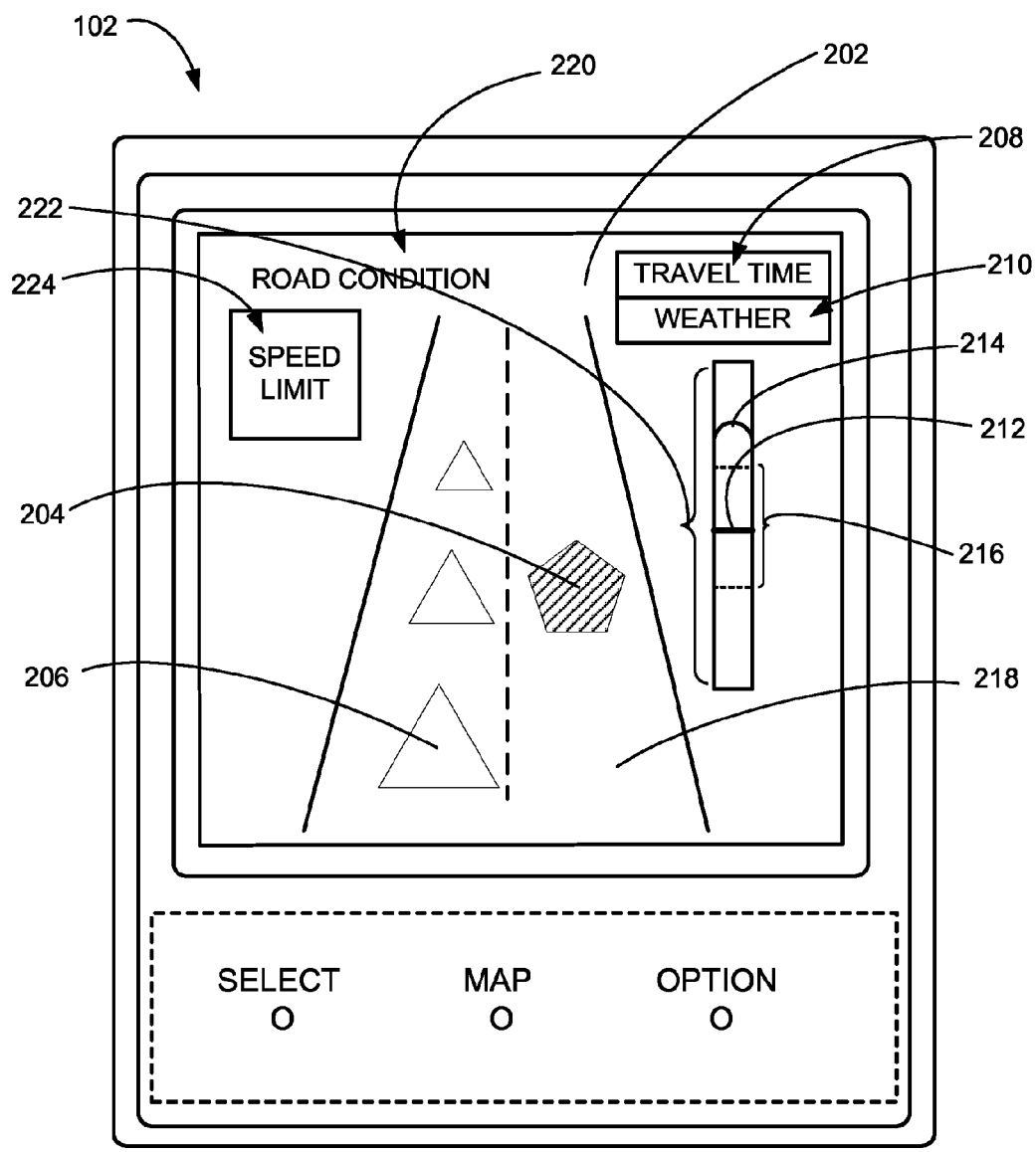
FIG. 2 is a display interface of the first device.

Referring now to FIG. 2, therein is shown a display interface 202 of the first device 102. The display interface 202 can depict a user icon 204, a virtual companion icon 206, a travel time 208, a weather condition 210, a safe speed 212, a user's speed 214, a buffer zone 216, a travel path 218, a road condition 220, a bar graph 222, and a speed limit 224.

The user icon 204 can represent of the form of the user's transportation. For example, the user icon 204 can be represented with a geometrically shaped symbol, a silhouette of the transportation type, or some other representation of the user's transportation. The user icon 204 can be translucent, an outline, or colored.

The user icon 204 can change colors in response to changes in the user's speed 214 relative to the safe speed 212. For example, the user icon 204 can glow green when the user's speed 214 is the same or close to the safe speed 212. The user icon 204 can glow yellow when the user's speed 214 starts to exceed the safe speed 212. The user icon 204 can glow red when the user's speed 214 greatly exceeds the safe speed 212.

The user icon 204 can also change in display frequency, intensity, or brightness in response to the changes in the user's speed 214 relative to the safe speed 212. The user icon 204 can also undergo other changes in response to changes in the user's speed 214 relative to the safe speed 212, such as blinking on and off, flashing, change in size, or vibrating.

The virtual companion icon 206 can be shown next to the user icon 204 and together can show the difference between the user's speed 214 and the safe speed 212. The virtual companion icon 206 can appear in a number of forms. For example, the virtual companion icon can be represented with a geometrically shaped symbol, a silhouette of the transportation type, or some other representation of possible travelers.

The virtual companion icon 206 can also be shown alongside the user icon 204 at a speed showing the difference between the user's speed 214 and the safe speed 212. For example, when the user's speed 214 exceeds the safe speed 212, the virtual companion icon 206 will appear to be moving slower than the user icon 204. The virtual companion 206 can be accompanied by an alert, such as an audio alert, for notifying the driver that the user's speed 214 exceeded the safe speed 212.

For illustrative purposes, the navigation system 100 is described with the virtual companion icon 206 described as a single icon, although it is understood that the navigation system 100 can have a different configuration for the virtual companion icon 206. For example, there can be more than one of the virtual companion icon 206.

Also for illustrative purposes, the navigation system 100 is described with the virtual companion icon 206 shown as traveling slower than the user icon 204, although it is understood that the navigation system 100 can depict the virtual companion icon 206 differently. For example, the virtual companion icon 206 can be depicted as passing the user icon 204 if the user's speed 214 is lower than the safe speed 212.

Further for illustrative purposes, the navigation system 100 is shown with the user icon 204 having a different shape than the virtual companion icon 206, although it is understood that the navigation system 100 can have the user icon 204 and the virtual companion icon 206 in different configurations. For example, the user icon 204 and the virtual companion icon 206 can be both of the same geometric shape. Also for example, the user icon 204 and the virtual companion icon 206 can display exceeding or not exceeding the safe speed 212 in the same manner, such as flashing or changing colors.

Yet further for illustrative purposes, the navigation system 100 is described with visual depiction of the user icon 204 and the virtual companion icon 206 to compare the user's speed 214 relative to the safe speed 212, although it is understood that the navigation system 100 can provide notification of the relative speeds differently. For example, the navigation system 100 can include audio prompt or reminders.

The safe speed 212 can represent a travel speed that maximizes speed balanced against the risk of an accident along the travel path 218. For example, the safe speed 212 can be limited by the speed limit 224 posted along the travel path 218. The safe speed 212 can depend on the road condition 220, the weather condition 210, or the travel time 208 along the travel path 218.

The safe speed 212 can be depicted in different ways. For example, the safe speed 212 can be represented with relative speeds of the user icon 204 and the virtual companion icon 206 juxtaposed to one another. Another example is that the safe speed 212 can also be represented by the bar graph 222 with an indicator for the safe speed 212.

For illustrative purposes, the navigation system 100 is described with the bar graph 222 as a possible indicator type for the safe speed 212, although it is understood that the navigation system 100 can have different forms of graphs. For example, the graph can be a circular graph or a ring graph.

The user's speed 214 can represent the speed the user is traveling on the travel path 218. For example, the user's speed 214 can be represented with variable relative speeds of the user icon 204 and the virtual companion icon 206. Another example is that the user's speed 214 can also be represented by the bar graph 222 with an indicator for the user's speed 214.

For illustrative purposes, the navigation system 100 is described with the safe speed 212 and the user's speed 214 described as graphical representations, although it is understood that they can be represented in other ways. For example, the safe speed 212 and the user's speed 214 can be represented by numeric displays.

The buffer zone 216 can exist to account for variations in the user's speed 214 and to show allowable variation of the user's speed 214 around the safe speed 212. For example, the buffer zone 216 can allow for 5% variation in speed around the safe speed 212 before the user's speed 214 is considered too high or too low of a speed. The buffer zone 216 can be selected by the navigation system 100 or can be selected by a user.

The travel time 208 can represent the time spent on the travel path 218. For example, the travel time 208 can indicate the day of the week, the season, time of day, and whether it is a high travel time such as a long weekend.

The weather condition 210 can indicate many possible weather patterns along the travel path 218. For example, the weather condition 210 can indicate clear skies, rain, fog, sleet, dust, haze, or snow. The road condition 220 can describe the condition of the travel path 218 that can affect travel speed. For example, the road condition 220 can represent a local road with potholes, a freeway in good condition, an unpaved road, a road with black ice, or a narrow bridge.

The travel path 218 can represent any path a user may traverse with the navigation system 100. For example, the travel path 218 can represent a route, a road segment, a hiking trail, a bike trail, or can include different types of paths.

The speed limit 224 can indicate a posted speed limit along the travel path 218, such as 65 miles per hour for a freeway or 25 miles per hour for a residential road. The speed limit 224 can also indicate a maximum speed limit.

Figure 3:
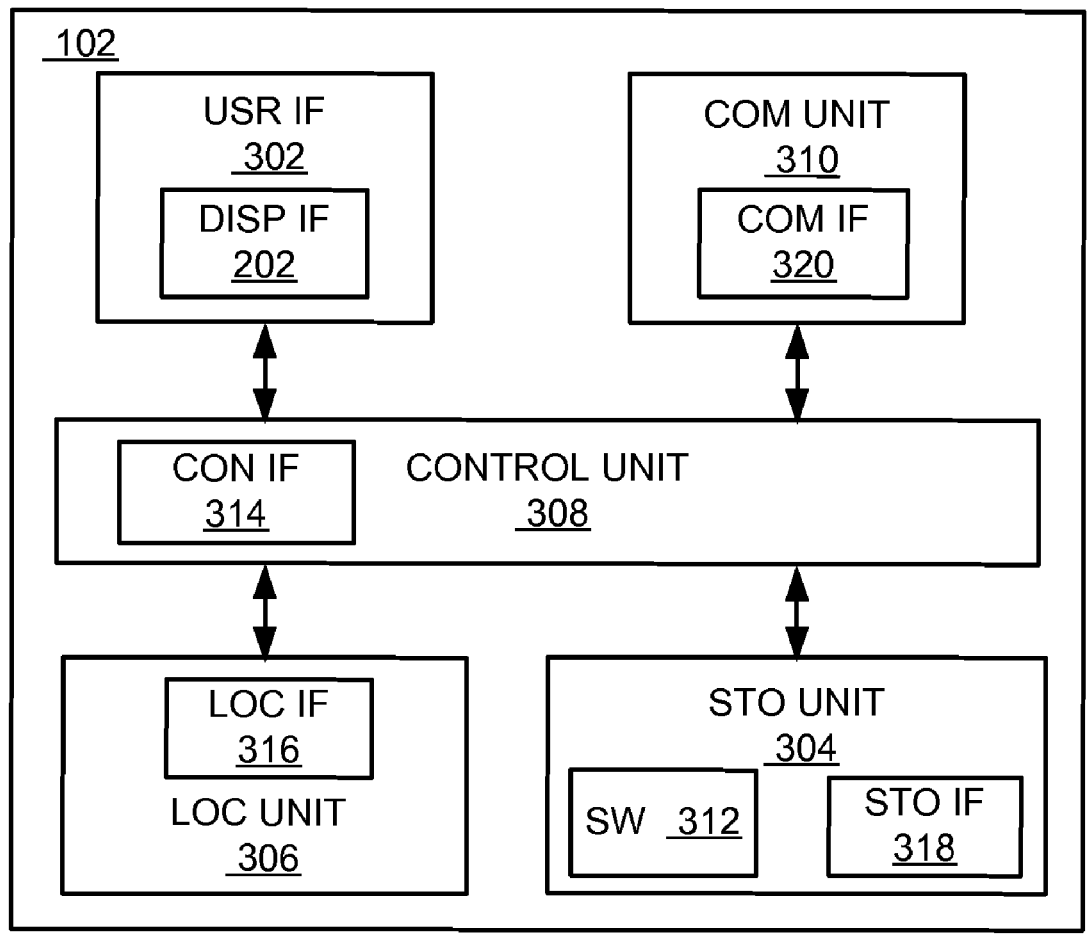
FIG. 3 is an exemplary block diagram of the first device.

Referring now to FIG. 3, therein is shown an exemplary block diagram of the first device 102. The first device 102 can include a user interface 302, a storage unit 304, a location unit 306, a control unit 308, and a communication unit 310.

The user interface 302 allows a user (not shown) to interface and interact with the first device 102. The user interface 302 can include an input device and an output device. Examples of the input device of the user interface 302 can include a keypad, a touchpad, soft-keys, a keyboard, a microphone, or any combination thereof to provide data and communication inputs. Examples of the output device of the user interface 302 can include the display interface 202. The display interface 202 can include a display, a projector, a video screen, a speaker, or any combination thereof.

The control unit 308 can execute a software 312 to provide the intelligence of the navigation system 100. The control unit 308 can operate the user interface 302 to display information generated by the navigation system 100. The control unit 308 can also execute the software 312 for the other functions of the navigation system 100, including receiving location information from the location unit 306. The control unit 308 can further execute the software 312 for interaction with the communication path 104 of FIG. 1 via the communication unit 310.

The control unit 308 can be implemented in a number of different manners. For example, the control unit 308 can be a processor, an embedded processor, a microprocessor, a hardware control logic, a hardware finite state machine (FSM), a digital signal processor (DSP), or a combination thereof.

The control unit 308 can include a controller interface 314. The controller interface 314 can be used for communication between the control unit 308 and other functional units in the first device 102. The controller interface 314 can also be used for communication that is external to the first device 102.

The controller interface 314 can receive information from the other functional units or from external sources, or can transmit information to the other functional units or to external destinations. The external sources and the external destinations refer to sources and destinations external to the first device 102.

The controller interface 314 can be implemented in different ways and can include different implementations depending on which functional units or external units are being interfaced with the controller interface 314. For example, the controller interface 314 can be implemented with a pressure sensor, an inertial sensor, a microelectromechanical system (MEMS), optical circuitry, waveguides, wireless circuitry, wireline circuitry, or a combination thereof.

The location unit 306 can generate location information, current heading, and current speed of the first device 102, as examples. The location unit 306 can be implemented in many ways. For example, the location unit 306 can function as at least a part of a global positioning system (GPS), an inertial navigation system, a cell-tower location system, a pressure location system, or any combination thereof.

The location unit 306 can include a location interface 316. The location interface 316 can be used for communication between the location unit 306 and other functional units in the first device 102. The location interface 316 can also be used for communication that is external to the first device 102.

The location interface 316 can receive information from the other functional units or from external sources, or can transmit information to the other functional units or to external destinations. The external sources and the external destinations refer to sources and destinations external to the first device 102.

The location interface 316 can include different implementations depending on which functional units or external units are being interfaced with the location unit 306. The location interface 316 can be implemented with technologies and techniques similar to the implementation of the controller interface 314.

The storage unit 304 can store the software 312. The storage unit 304 can also store the relevant information, such as advertisements, points of interest (POI), navigation routing entries, or any combination thereof.

The storage unit 304 can be a volatile memory, a nonvolatile memory, an internal memory, an external memory, or a combination thereof. For example, the storage unit 304 can be a nonvolatile storage such as non-volatile random access memory (NVRAM), Flash memory, disk storage, or a volatile storage such as static random access memory (SRAM).

The storage unit 304 can include a storage interface 318. The storage interface 318 can be used for communication between the location unit 306 and other functional units in the first device 102. The storage interface 318 can also be used for communication that is external to the first device 102.

The storage interface 318 can receive information from the other functional units or from external sources, or can transmit information to the other functional units or to external destinations. The external sources and the external destinations refer to sources and destinations external to the first device 102.

The storage interface 318 can include different implementations depending on which functional units or external units are being interfaced with the storage unit 304. The storage interface 318 can be implemented with technologies and techniques similar to the implementation of the controller interface 314.

The communication unit 310 can enable external communication to and from the first device 102. For example, the communication unit 310 can permit the first device 102 to communicate with the second device 106 of FIG. 1, an attachment, such as a peripheral device or a computer desktop, and the communication path 104.

The communication unit 310 can also function as a communication hub allowing the first device 102 to function as part of the communication path 104 and not limited to be an end point or terminal unit to the communication path 104. The communication unit 310 can include active and passive components, such as microelectronics or an antenna, for interaction with the communication path 104.

The communication unit 310 can include a communication interface 320. The communication interface 320 can be used for communication between the communication unit 310 and other functional units in the first device 102. The communication interface 320 can receive information from the other functional units or can transmit information to the other functional units.

The communication interface 320 can include different implementations depending on which functional units are being interfaced with the communication unit 310. The communication interface 320 can be implemented with technologies and techniques similar to the implementation of the controller interface 314.

For illustrative purposes, the navigation system 100 is shown with the partition having the user interface 302, the storage unit 304, the location unit 306, the control unit 308, and the communication unit 310 although it is understood that the navigation system 100 can have a different partition. For example, the software 312 can be partitioned differently such that some or all of its function can be in the control unit 308, the location unit 306, and the communication unit 310. Also, the first device 102 can include other functional units not shown in FIG. 3 for clarity.

The functional units in the first device 102 can work individually and independently of the other functional units. The first device 102 can work individually and independently from the second device 106 and the communication path 104.

Figure 4:
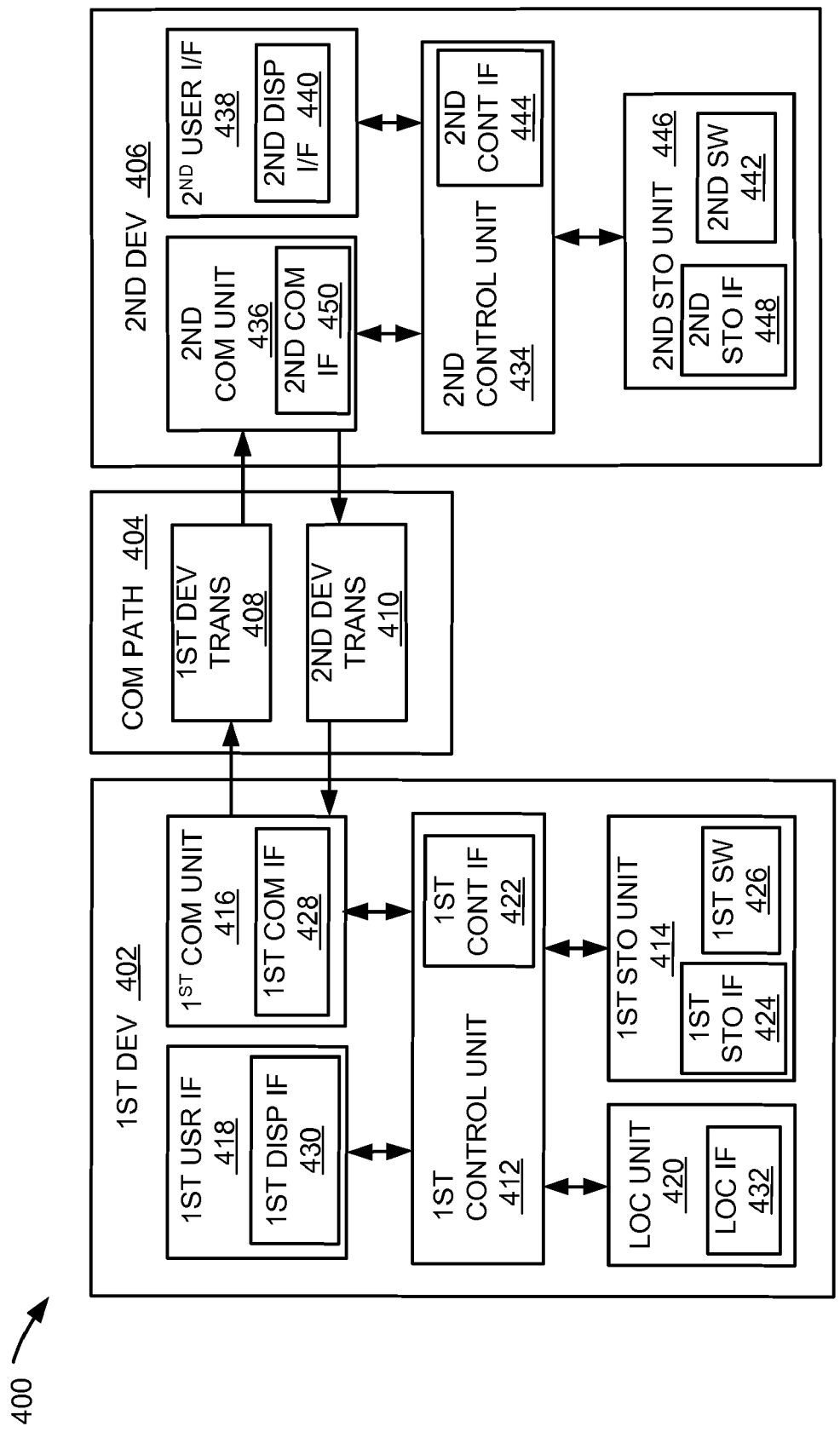
FIG. 4 is an exemplary block diagram of a navigation system with speed monitoring mechanism in a second embodiment of the present invention.

Referring now to FIG. 4, therein is shown an exemplary block diagram of a navigation system 400 with speed monitoring mechanism in a second embodiment of the present invention. The navigation system 400 can include a first device 402, a communication path 404, and a second device 406.

The first device 402 can communicate with the second device 406 over the communication path 404. For example, the first device 402, the communication path 404, and the second device 406 can be the first device 102 of FIG. 1, the communication path 104 of FIG. 1, and the second device 106 of FIG. 1, respectively. The screen shot shown on the display interface 202 described in FIG. 2 can represent the screen shot for the navigation system 400.

The first device 402 can send information in a first device transmission 408 over the communication path 404 to the second device 406. The second device 406 can send information in a second device transmission 410 over the communication path 404 to the first device 402.

For illustrative purposes, the navigation system 400 is shown with the first device 402 as a client device, although it is understood that the navigation system 400 can have the first device 402 as a different type of device. For example, the first device 402 can be a server.

Also for illustrative purposes, the navigation system 400 is shown with the second device 406 as a server, although it is understood that the navigation system 400 can have the second device 406 as a different type of device. For example, the second device 406 can be a client device.

For brevity of description in this embodiment of the present invention, the first device 402 will be described as a client device and the second device 406 will be described as a server device. The present invention is not limited to this selection for the type of devices. The selection is an example of the present invention.

The first device 402 can include a first control unit 412, a first storage unit 414, a first communication unit 416, a first user interface 418, and a location unit 420. The first device 402 can be similarly described by the first device 102.

The first control unit 412 can include a first controller interface 422. The first control unit 412 and the first controller interface 422 can be similarly described as the control unit 308 of FIG. 3 and the controller interface 314 of FIG. 3, respectively.

The first storage unit 414 can include a first storage interface 424. The first storage unit 414 and the first storage interface 424 can be similarly described as the storage unit 304 of FIG. 3 and the storage interface 318 of FIG. 3, respectively. A first software 426 can be stored in the first storage unit 414.

The first communication unit 416 can include a first communication interface 428. The first communication unit 416 and the first communication interface 428 can be similarly described as the communication unit 310 of FIG. 3 and the communication interface 320 of FIG. 3, respectively.

The first user interface 418 can include a first display interface 430. The first user interface 418 and the first display interface 430 can be similarly described as the user interface 302 of FIG. 3 and the display interface 202 of FIG. 3, respectively.

The location unit 420 can include a location interface 432. The location unit 420 and the location interface 432 can be similarly described as the location unit 306 of FIG. 3 and the location interface 316 of FIG. 3, respectively.

The performance, architectures, and type of technologies can also differ between the first device 102 and the first device 402. For example, the first device 102 can function as a single device embodiment of the present invention and can have a higher performance than the first device 402. The first device 402 can be similarly optimized for a multiple device embodiment of the present invention.

For example, the first device 102 can have a higher performance with increased processing power in the control unit 308 compared to the first control unit 412. The storage unit 304 can provide higher storage capacity and access time compared to the first storage unit 414.

Also for example, the first device 402 can be optimized to provide increased communication performance in the first communication unit 416 compared to the communication unit 310. The first storage unit 414 can be sized smaller compared to the storage unit 304. The first software 426 can be smaller than the software 312 of FIG. 3.

The second device 406 can be optimized for implementing the present invention in a multiple device embodiment with the first device 402. The second device 406 can provide the additional or higher performance processing power compared to the first device 402. The second device 406 can include a second control unit 434, a second communication unit 436, and a second user interface 438.

The second user interface 438 allows a user (not shown) to interface and interact with the second device 406. The second user interface 438 can include an input device and an output device. Examples of the input device of the second user interface 438 can include a keypad, a touchpad, soft-keys, a keyboard, a microphone, or any combination thereof to provide data and communication inputs. Examples of the output device of the second user interface 438 can include a second display interface 440. The second display interface 440 can include a display, a projector, a video screen, a speaker, or any combination thereof.

The second control unit 434 can execute a second software 442 to provide the intelligence of the second device 106 of the navigation system 400. The second software 442 can operate in conjunction with the first software 426. The second control unit 434 can provide additional performance compared to the first control unit 412 or the control unit 308.

The second control unit 434 can operate the second user interface 438 to display information. The second control unit 434 can also execute the second software 442 for the other functions of the navigation system 400, including operating the second communication unit 436 to communicate with the first device 402 over the communication path 404.

The second control unit 434 can be implemented in a number of different manners. For example, the second control unit 434 can be a processor, an embedded processor, a microprocessor, a hardware control logic, a hardware finite state machine (FSM), a digital signal processor (DSP), or a combination thereof.

The second control unit 434 can include a second controller interface 444. The second controller interface 444 can be used for communication between the second control unit 434 and other functional units in the second device 406. The second controller interface 444 can also be used for communication that is external to the second device 406.

The second controller interface 444 can receive information from the other functional units or from external sources, or can transmit information to the other functional units or to external destinations. The external sources and the external destinations refer to sources and destinations external to the second device 406.

The second controller interface 444 can be implemented in different ways and can include different implementations depending on which functional units or external units are being interfaced with the second controller interface 444. For example, the second controller interface 444 can be implemented with a pressure sensor, an inertial sensor, a microelectromechanical system (MEMS), optical circuitry, waveguides, wireless circuitry, wireline circuitry, or a combination thereof.

A second storage unit 446 can store the second software 442. The second storage unit 446 can also store the relevant information, such as advertisements, points of interest (POI), navigation routing entries, or any combination thereof. The second storage unit 446 can be sized to provide the additional storage capacity to supplement the first storage unit 414.

For illustrative purposes, the second storage unit 446 is shown as a single element, although it is understood that the second storage unit 446 can be a distribution of storage elements. Also for illustrative purposes, the navigation system 400 is shown with the second storage unit 446 as a single hierarchy storage system, although it is understood that the navigation system 400 can have the second storage unit 446 in a different configuration. For example, the second storage unit 446 can be formed with different storage technologies forming a memory hierarchal system including different levels of caching, main memory, rotating media, or off-line storage.

The second storage unit 446 can be a volatile memory, a nonvolatile memory, an internal memory, an external memory, or a combination thereof. For example, the second storage unit 446 can be a nonvolatile storage such as nonvolatile random access memory (NVRAM), Flash memory, disk storage, or a volatile storage such as static random access memory (SRAM).

The second storage unit 446 can include a second storage interface 448. The second storage interface 448 can be used for communication between the location unit 306 and other functional units in the second device 406. The second storage interface 448 can also be used for communication that is external to the second device 406.

The second storage interface 448 can receive information from the other functional units or from external sources, or can transmit information to the other functional units or to external destinations. The external sources and the external destinations refer to sources and destinations external to the second device 406.

The second storage interface 448 can include different implementations depending on which functional units or external units are being interfaced with the second storage unit 446. The second storage interface 448 can be implemented with technologies and techniques similar to the implementation of the second controller interface 444.

The second communication unit 436 can enable external communication to and from the second device 406. For example, the second communication unit 436 can permit the second device 406 to communicate with the first device 402 over the communication path 404.

The second communication unit 436 can also function as a communication hub allowing the second device 406 to function as part of the communication path 404 and not limited to be an end point or terminal unit to the communication path 404. The second communication unit 436 can include active and passive components, such as microelectronics or an antenna, for interaction with the communication path 404.

The second communication unit 436 can include a second communication interface 450. The second communication interface 450 can be used for communication between the second communication unit 436 and other functional units in the second device 406. The second communication interface 450 can receive information from the other functional units or can transmit information to the other functional units.

The second communication interface 450 can include different implementations depending on which functional units are being interfaced with the second communication unit 436. The second communication interface 450 can be implemented with technologies and techniques similar to the implementation of the second controller interface 444.

The first communication unit 416 can couple with the communication path 404 to send information to the second device 406 in the first device transmission 408. The second device 406 can receive information in the second communication unit 436 from the first device transmission 408 of the communication path 404.

The second communication unit 436 can couple with the communication path 404 to send information to the first device 402 in the second device transmission 410. The first device 402 can receive information in the first communication unit 416 from the second device transmission 410 of the communication path 404. The navigation system 400 can be executed by the first control unit 412, the second control unit 434, or a combination thereof.

For illustrative purposes, the second device 106 is shown with the partition having the second user interface 438, the second storage unit 446, the second control unit 434, and the second communication unit 436, although it is understood that the second device 106 can have a different partition. For example, the second software 442 can be partitioned differently such that some or all of its function can be in the second control unit 434 and the second communication unit 436. Also, the second device 406 can include other functional units not shown in FIG. 4 for clarity.

The functional units in the first device 402 can work individually and independently of the other functional units. The first device 402 can work individually and independently from the second device 406 and the communication path 404.

The functional units in the second device 406 can work individually and independently of the other functional units. The second device 406 can work individually and independently from the first device 402 and the communication path 404.

For illustrative purposes, the navigation system 400 is described by operation of the first device 402 and the second device 406. It is understood that the first device 402 and the second device 406 can operate any of the modules and functions of the navigation system 400. For example, the first device 402 is described to operate the location unit 420, although it is understood that the second device 406 can also operate the location unit 420.

Figure 5:
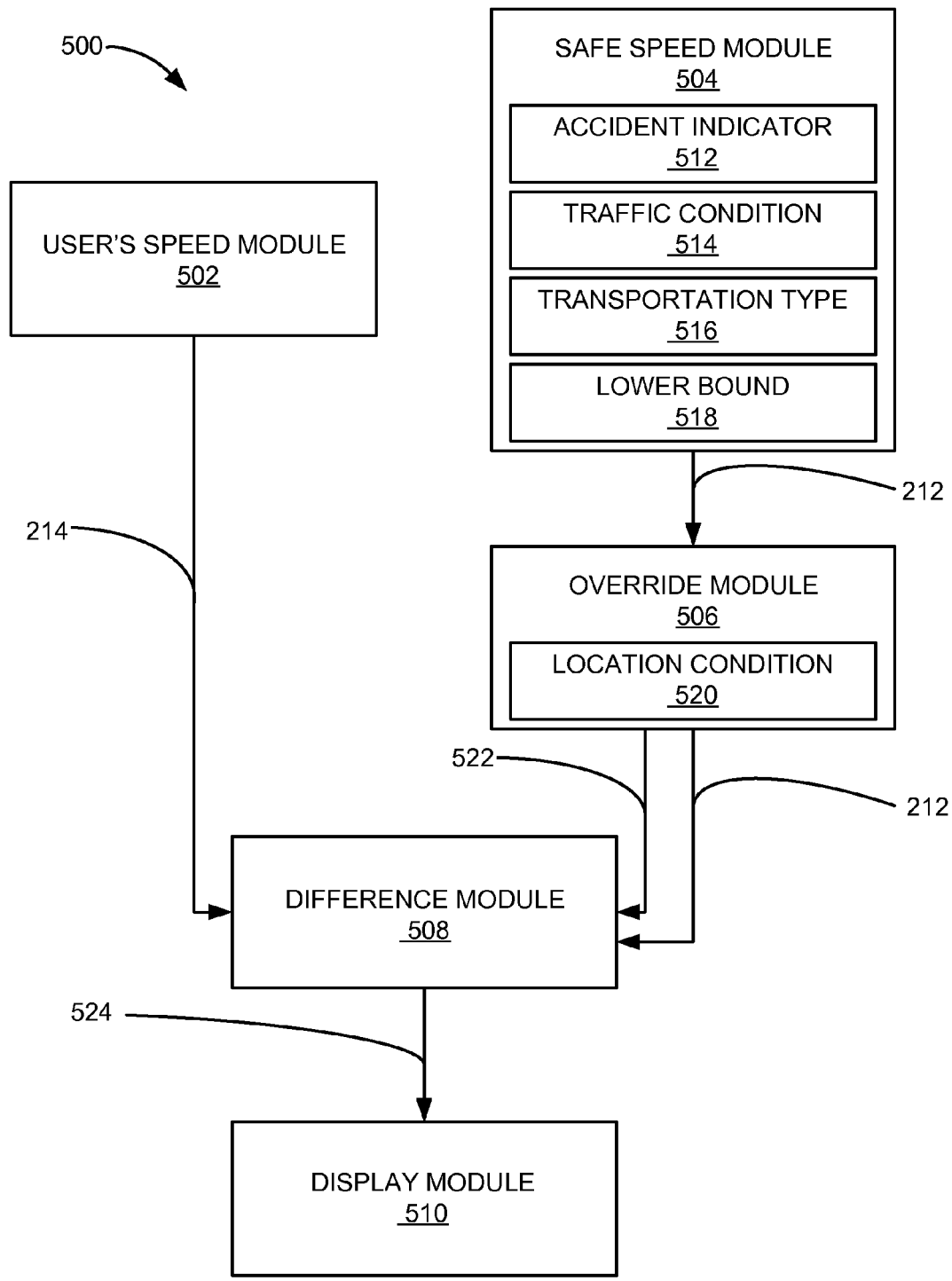
FIG. 5 is a navigation system with speed monitoring mechanism in a third embodiment of the present invention.

Referring now to FIG. 5, therein is shown a navigation system 500 with speed monitoring mechanism in a third embodiment of the present invention. The navigation system 500 can have inputs into one module be available to the other modules as described in the examples below without requiring explicit figure labeling for clarity.

The navigation system 500 can include a user's speed module 502 which can be coupled to a difference module 508. The user's speed module 502 can track or calculate the user's speed 214 of FIG. 2 along the travel path 218 using different methods. For example, the user's speed module 502 can track the user's speed 214 using the speed reading from a speedometer, such as a vehicle or bicycle speedometer.

The user's speed module 502 can calculate the user's speed 214 by using a global positioning system to determine the user's speed 214. For example, using global positioning system, the location of the navigation system 500 can be determined at two or more points in time. The time difference and distance between the points can be used to calculate the user's speed 214.

The user's speed module 502 can also use cellular triangulation or other wireless triangulation methods to determine the location of the navigation system 500 at two or more points in time. The time difference and distance between the points can be used to calculate the user's speed 214.

For illustrative purposes, the navigation system 500 is described with the user's speed module 502 calculating the user's speed 214 with time and distance differences, although it is understood that the navigation system 500 can operate the user's speed module 502 to calculate the user's speed 214 in other ways. For example, the user's speed module 502 can also use differences in the signal strength of a signal sent from a stationary point to calculate the user's speed 214. The user's speed module 502 can use the changes in signal strength over a time interval to calculate the user's speed 214.

The navigation system 500 can also include a safe speed module 504, coupled to an override module 506. The safe speed module 504 can calculate the safe speed 212 of FIG. 2 for traveling along a given path using different information for that path. For example, the safe speed module 504 can calculate the safe speed 212 for the travel path 218 using an accident indicator 512, the weather condition 210 of FIG. 2, the road condition 220 of FIG. 2, the speed limit 224 of FIG. 2, a traffic condition 514, the travel time 208 of FIG. 2, a transportation type 516, a lower bound 518, or a combination thereof at or around the travel path 218.

The accident indicator 512 can indicate accident issues along the travel path 218. For example, the accident indicator 512 can represent an accident farther down the travel path 218 from the current location. The accident indicator 512 can include accident statistics from an accident database that could suggest a dangerous section of the travel path 218 under given conditions.

The traffic condition 514 can represent the traffic flow and average traffic speed on the travel path 218. For example, the traffic condition 514 can indicate a clear condition, a stop-and-go traffic, or a slowdown in traffic flow near merging lanes.

The transportation type 516 can represent a mode of transportation employed by the user of the navigation system 500. For example, the transportation type 516 can include a motorized vehicle, a human powered vehicle, or a bipedal mode.

The transportation type 516 can be input by the user or automatically detected by the navigation system 500.

The lower bound 518 can be the lower limit to the safe speed 212 on the travel path 218 and can be based on the traffic condition 514. For example, the lower bound 518 of the safe speed 212 can be set 10% under the average speed of traffic as indicated by the traffic condition 514. The safe speed 212 can be calculated to not go lower than the lower bound 518.

The safe speed module 504 can also use historical accident information from the accident indicator 512 in conjunction with the traffic condition 514 to determine the lower bound 518 of the safe speed 212. For example, after downloading both the accident indicator 512 and the traffic condition 514, the safe speed module 504 can determine the lower bound 518 of the safe speed 212 that minimizes the statistical risk of an accident due to differences in speed as compared to surrounding traffic as shown by the accident indicator 512 while also staying close to the average speed as indicated by the traffic condition 514.

The safe speed module 504 can calculate the safe speed 212 in a number of ways. For example, the safe speed module 504 can set the safe speed 212 as the speed limit 224, if available. The safe speed module 504 can lower the safe speed 212 to match and safely approach the travel path 218 with a lower speed limit than the maximum as indicated by the traffic condition 514 or the road condition 220.

The safe speed module 504 can further lower the safe speed 212 if the accident indicator 512 shows a problem in the travel path 218 that further decreases the average speed than indicated by the traffic condition 514. Also, for example, if the weather condition 210 indicates sleet along the travel path 218, the safe speed module 504 can further reduce the safe speed 212 below the reduced speed resulting from the accident indicator 512.

The safe speed module 504 can also lower the safe speed 212 based on the characteristics of the transportation type 516 being used. For example, the safe speed 212 for a truck can be lower than the safe speed 212 for a sedan.

The safe speed module 504 can make sure that the safe speed 212 is not lowered below the lower bound 518. For example, if conditions are such that the safe speed 212 will be lowered below the lower bound 518, the safe speed module 504 can set the safe speed 212 to the lower bound 518.

For illustrative purposes, the navigation system 500 is described with the safe speed module 504 calculating the safe speed 212 in a reduction only direction, although it is understood that the navigation system 500 can operate the safe speed module 504 differently. For example, the safe speed module 504 can start with the safe speed 212 matching the average speed allowed or indicated by the traffic condition 514 along the travel path 218.

The safe speed module 504 can increase or decrease the safe speed 212 based on the other factors. If the average speed as indicated by the traffic condition 514 is above the speed limit 224, then the safe speed module 504 can decrease the safe speed 212 to not exceed the speed limit 224. If the average speed as indicated by the traffic condition 514 is significantly below the speed limit 224, then the safe speed module 504 can increase the safe speed 212 if the other factors do not restrict this increase. The safe speed module 504 can also use the accident indicator 512 together with the traffic condition 514, the weather condition 210, the travel time 208, or other relevant factors to minimize the risk of an accident while maximizing the safe speed 212.

Also for illustrative purposes, the navigation system 500 is described with the safe speed module 504 calculating the safe speed 212 in a sequential method, although it is understood that the navigation system 500 can operate the safe speed module 504 differently. For example, the safe speed module 504 can utilize all the factors simultaneously with each factor assigned a weight value to indicate priority or importance for any of the factors. The weights may be varied to vary the priority or importance of the factors relative to the other factors for calculating the safe speed 212 to account for the changing conditions.

It has been discovered that the present invention provides the navigation system 500 with speed monitoring mechanism and method of operation thereof with the ability to determine the safe speed 212 taking into account varied factors. The safe speed module 504 of the navigation system 500 furnishes important and heretofore unknown and unavailable solutions, capabilities, and functional aspects for calculating the safe speed 212. The safe speed module 504 utilizes multiple factors that include the traffic condition 514 and the accident indicator 512 to calculate the safe speed 212 that takes into account relevant conditions going far beyond the speed limit 224. The safe speed module 504 provides the benefit of calculating the safe speed 212 while taking into account the flow of traffic as shown by the traffic condition 514 to make sure the safe speed 212 does not fall to a point that would disrupt the flow of traffic where it would become unsafe.

The physical transformation of the safe speed module 504 results in movement in the physical world, such as people using the user interface 302 of FIG. 3 or vehicles, based on the operation of the navigation system 500. As the movement in the physical world occurs, the movement itself creates additional information that is converted back to the safe speed 212 for the continued operation of the navigation system 500 and to continue the movement in the physical world.

The navigation system 500 can also include the override module 506. The override module 506 can override the safe speed 212 with an override speed 522 if the override speed 522 is lower than the safe speed 212 calculated by the safe speed module 504. The override module 506 can use a location condition 520 to generate the override speed 522. The override module 506 can also use pre-loaded information from the travel path 218, such as local speed limits and road type, to generate the override speed 522.

The location condition 520 can represent information that is physically proximate to the navigation system 500. The location condition 520 can be available to the navigation system 500 that may or may not be reflected by the other information feeds or that the information is time critical for emergency or immediate action. For example, the location condition 520 can represent warnings from proximity sensors, information from rain sensors that control automatic windshield wipers, acceleration information from inertial sensors, tire slippage information from traction control systems, and light information from light sensors that control automatic headlights.

For illustrative purposes, the navigation system 500 is described with the override module 506 described as operating in conjunction with the safe speed module 504 although it is understood that the navigation system 500 can operate differently. For example, the override module 506 can operate independently if the safe speed 212 from the safe speed module 504 is unavailable.

It has been discovered that the present invention provides the navigation system 500 with the capability to take local conditions into consideration when calculating the safe speed 212. The override module 506 can generate the override speed 522 that can be can be used to override the safe speed 212. The override module 506 provides the navigation system 500 with the ability to use the location condition 520 to determine whether the safe speed 212 is appropriate to the particular location, and to override the safe speed 212 with the override speed 522 if necessary.

The physical transformation of the override speed 522 results in movement in the physical world, such as people using the display interface 202 or vehicles, based on the operation of the navigation system 500. As the movement in the physical world occurs, the movement itself creates additional information that is converted back to the location condition 520 and the override speed 522 for the continued operation of the navigation system 500 and to continue the movement in the physical world.

The navigation system 500 can also include the difference module 508 that can be coupled to both the override module 506 and the user's speed module 502. The difference module 508 can calculate the difference between the safe speed 212 or the override speed 522, whichever is available, and the user's speed 214 for later display to the user.

The difference module 508 can use the override speed 522 instead of the safe speed 212 if the override module 506 overrides the safe speed 212 with the override speed 522. For example, the override speed 522 can be used as the safe speed 212 by the difference module 508 if the safe speed 212 is not available. If the override speed 522 is the same or higher than the safe speed 212, the safe speed 212 can be used in the difference module 508.

The difference module 508 can obtain the safe speed 212 from the safe speed module 504 and the user's speed 214 from the user's speed module 502, and then subtract the user's speed 214 from the safe speed 212 to obtain a difference value 524 to be sent to a display module 510. The difference module 508 can calculate the difference value 524 as a positive or negative value that can indicate whether the user's speed 214 is too low or too high relative to the safe speed 212. The difference module 508 can also use the override speed 522 instead of the safe speed 212 if the override speed 522 is lower than the safe speed 212 or if the safe speed 212 is unavailable.

For illustrative purposes, the navigation system 500 is described with the difference module 508 subtracting the user's speed 214 from the safe speed 212 to obtain the difference value 524, although it is understood that the navigation system 500 can operate the difference module 508 differently. For example, the difference module 508 can subtract the safe speed 212 from the user's speed 214 to obtain the difference value 524.

The navigation system 500 can include the display module 510. The display module 510 can process information sent to it by the safe speed module 504, the user's speed module 502, the override module 506, and the difference module 508. The display module 510 can also display information on the display interface 202 of FIG. 2. For example, the display module 510 can use the difference value 524 from the difference module 508 and can display on the display interface 202 the user icon 204 of FIG. 2 adjacent to the virtual companion icon 206 of FIG. 2.

For illustrative purposes, the display module 510 will be described as using the information from the difference module 508, although it is understood that the display module 510 can use information from the safe speed module 504, the user's speed module 502, and the override module 506. For example, the display module 510 can represent the travel time 208, the weather condition 210, and the speed limit 224 on the display interface 202.

The display module 510 can select the user icon 204 and the virtual companion icon 206 for displaying the difference value 524. The virtual companion icon 206 can be depicted as moving at the same speed as the user if the user's speed 214 is the same or within the buffer zone 216 of FIG. 2 to the safe speed 212. The virtual companion icon 206 can be depicted as moving slower than the user icon 204 if the user's speed exceeds the safe speed 212. The virtual companion icon 206 can be depicted as moving faster than the user icon 204 if the user's speed is lower than the safe speed 212.

The display module 510 can depict the difference value 524 in different ways. The display module 510 can present the difference value 524 from the difference module 508 as a color of the user icon 204, lighting pattern of the user icon 204, or some combination thereof. For example, the user icon 204 can glow green while the user's speed 214 is matching the safe speed 212, yellow when the user's speed 214 begins to exceed the safe speed 212, and pulse rapidly red when the user's speed 214 greatly exceeds the safe speed 212. The user icon 204 can also glow blue when the user's speed 214 is lower than the safe speed 212.

The display module 510 can also depict the difference value 524 as the bar graph 222 of FIG. 2. For example, the bar graph 222 can have an indicator for the safe speed 212, the buffer zone 216 around the safe speed 212, and another indicator for the user's speed 214. The display module 510 can also cause the display interface 202 to flash in response to the user's speed 214 leaving the buffer zone 216 around the safe speed 212.

For illustrative purposes, the navigation system 500 is described with the display module 510 presenting the difference value 524 in discrete steps, although it is understood that the display module 510 can operate in a much more graduated fashion. For example, the display module 510 can cause the display interface 202 to use any shade of green, yellow, or red when coloring the user icon 204. The display module 510 does not need to use those specific colors and can use any color deemed appropriate. The display module 510 can also transition the colors in a graduated fashion and use any combination of shades and pulsing patterns. The display module 510 can cause the display interface 202 to display the difference value 524 in a continuous fashion as conditions change.

The display module 510 can also set the buffer zone 216 around the safe speed 212. For example, the display module 510 can allow the user's speed 214 to vary within the buffer zone 216 before displaying the difference value 524.

It has also been discovered that the present invention provides the navigation system 100 with safe speed monitoring and a comparative display. The virtual companion icon 206 can display the difference between the user's speed 214 and the safe speed 212. The virtual companion icon 206 provides the navigation system 100 the capability to display the difference in a graduated manner rather than simply warning the user when the speed limit 224 has been exceeded.

The physical transformation of the safe speed 212 and the virtual companion icon 206 results in safe movement in the physical world, such as people using the display interface 202 or vehicles, based on the operation of the navigation system 100. As the movement in the physical world occurs, the movement itself creates additional information that is converted back to the virtual companion icon 206 for the continued operation of the navigation system 100 and to continue the movement in the physical world.

It has been further discovered that the present invention provides the navigation system 500 with the buffer zone 216 for the safe speed 212. The display module 510 can display information to a user that intuitively helps the user maintain a proper speed. The display module 510 can display the difference value 524 in any number of forms which can help a user to keep the user's speed 214 as close to the safe speed 212 as possible. For example, the display module 510 can use the buffer zone 216 for providing a user an alert for exceeding the safe speed 212. The buffer zone 216 can also prevent frequent alerts that may inadvertently de-sensitize a user due to too many alerts or warnings.

The physical transformation of the buffer zone 216, the difference value 524, the user icon 204, or the virtual companion icon 206 results in safe movement in the physical world, such as people using the display interface 202 or vehicles, based on the operation of the navigation system 500. As the movement in the physical world occurs, the movement itself creates additional information that is converted back to the difference value 524, the user's speed 214, and the user's speed 214 relative to the buffer zone 216 for the continued operation of the navigation system 500 and to continue the movement in the physical world.

Thus, it has been discovered that the navigation system with speed monitoring mechanism and method of operation thereof furnishes important and heretofore unknown and unavailable solutions, capabilities, and functional aspects for monitoring speed, calculating a safe speed, and displaying the difference thereof.

The user's speed module 502 can be implemented by the navigation system 100 of FIG. 1. The user's speed module 502 can be implemented by the control unit 308 of FIG. 3. For example, the control unit 308 can receive speed readings or other data from outside sources such as a speedometer through the communication unit 310 of FIG. 3. The user's speed module 502 can then be implemented with the control unit 308 tracking the user's speed 214. The location unit 306 of FIG. 3 can provide the location readings for the control unit 308 to calculate the user's speed 214. The user's speed module 502 can also store the user's speed 214 in the storage unit 304 of FIG. 3.

The safe speed module 504 can be implemented by the navigation system 100. The safe speed module 504 can be implemented with the control unit 308 and can make use of the communication unit 310, the location unit 306, the storage unit 304, or a combination thereof.

For example, the safe speed module 504 can use the communication unit 310 to receive the traffic condition 514 and the weather condition 210. As a further example, the safe speed module 504 can determine location on the travel path 218 with the location unit 306, and can store the speed limit 224 along the travel path 218 in the storage unit 304. The safe speed module 504 can then utilize the control unit 308 to calculate the safe speed 212.

The override module 506 can be implemented by the navigation system 100. The override module 506 can be implemented by the control unit 308. For example, the control unit 308 can use the communication unit 310 to receive the location condition 520 and then can calculate the override speed 522.

The difference module 508 can be implemented by the navigation system 100. The difference module 508 can be implemented by the control unit 308, the storage unit 304, or a combination thereof. For example, the control unit 308 can calculate the user's speed 214 and the safe speed 212 and store the values in the storage unit 304. The control unit 308 can then use the user's speed 214 and the safe speed 212 to calculate the difference value 524.

The display module 510 can be implemented by the navigation system 100. The display module 510 can be implemented by the control unit 308, the display interface 202, or a combination thereof. For example, the control unit 308 can send the safe speed 212, the user's speed 214, the difference value 524, the road condition 220, and the weather condition 210 to the display interface 202. The display interface 202 can display the information to the user.

The user's speed module 502 can also be implemented by the first control unit 412 of FIG. 4. For example, the user's speed module 502 can receive the user's speed 214 through the first control unit 412, and can store the user's speed 214 if necessary in the first storage unit 414 of FIG. 4.

The safe speed module 504 can be implemented by the second control unit 434 of FIG. 4. For example, the second communication unit 436 of FIG. 4 can obtain the travel path 218 from the location unit 420 of FIG. 4. With this information, the second control unit 434 can access the second storage unit 446 of FIG. 4 to obtain the speed limit 224 for the travel path 218. The second control unit 434 can calculate the safe speed 212.

The override module 506 can be implemented by the first control unit 412. For example, the first control unit 412 can use the first communication unit 416 of FIG. 4 to receive the location condition 520 and the safe speed 212, and then generate the override speed 522.

The difference module 508 can be implemented by the first control unit 412, the first storage unit 414, the first communication unit 416, the communication path 404, the second device 406, or some combination thereof. For example, the first control unit 412 can calculate the user's speed 214 and can use the first communication unit 416 to receive through the communication path 404 the safe speed 212 as calculated by the second device 406. The user's speed 214 and the safe speed 212 can be stored in the first storage unit 414. The first control unit 412 can access the user's speed 214 and the safe speed 212 and use the two values to calculate the difference value 524.

The display module 510 can be implemented by the first control unit 412, the first storage unit 414, the display interface 202, or some combination thereof. For example, the first storage unit can send the user's speed 214 and the safe speed 212 to the first control unit 412. The first control unit 412 can send the user's speed 214, the safe speed 212, the difference value 524, the road condition 220, and the weather condition 210 to the display interface 202.

The navigation system 500 describes the module functions or order as an example. The modules can be partitioned differently. For example, the user's speed module can be implemented by the second control unit 434 instead of the first control unit 412. Each of the modules can operate individually and independently of the other modules.

The navigation system 500 can be partitioned between the first device 402 of FIG. 4 and the second device 406 of FIG. 4. For example, the navigation system 500 can be partitioned into the functional units of the first device 402, the second device 406, or a combination thereof. The navigation system 500 can also be implemented as additional functional units in the first device 102 of FIG. 1, the first device 402, the second device 406, or a combination thereof. For example, modules requiring greater amounts of computing power can be partitioned into the functional units of the second device 406. Modules that require information that could be impacted by the communication path 404 of FIG. 4 or that can be operated locally can be partitioned into the functional units of the first device 402.

Figure 6:
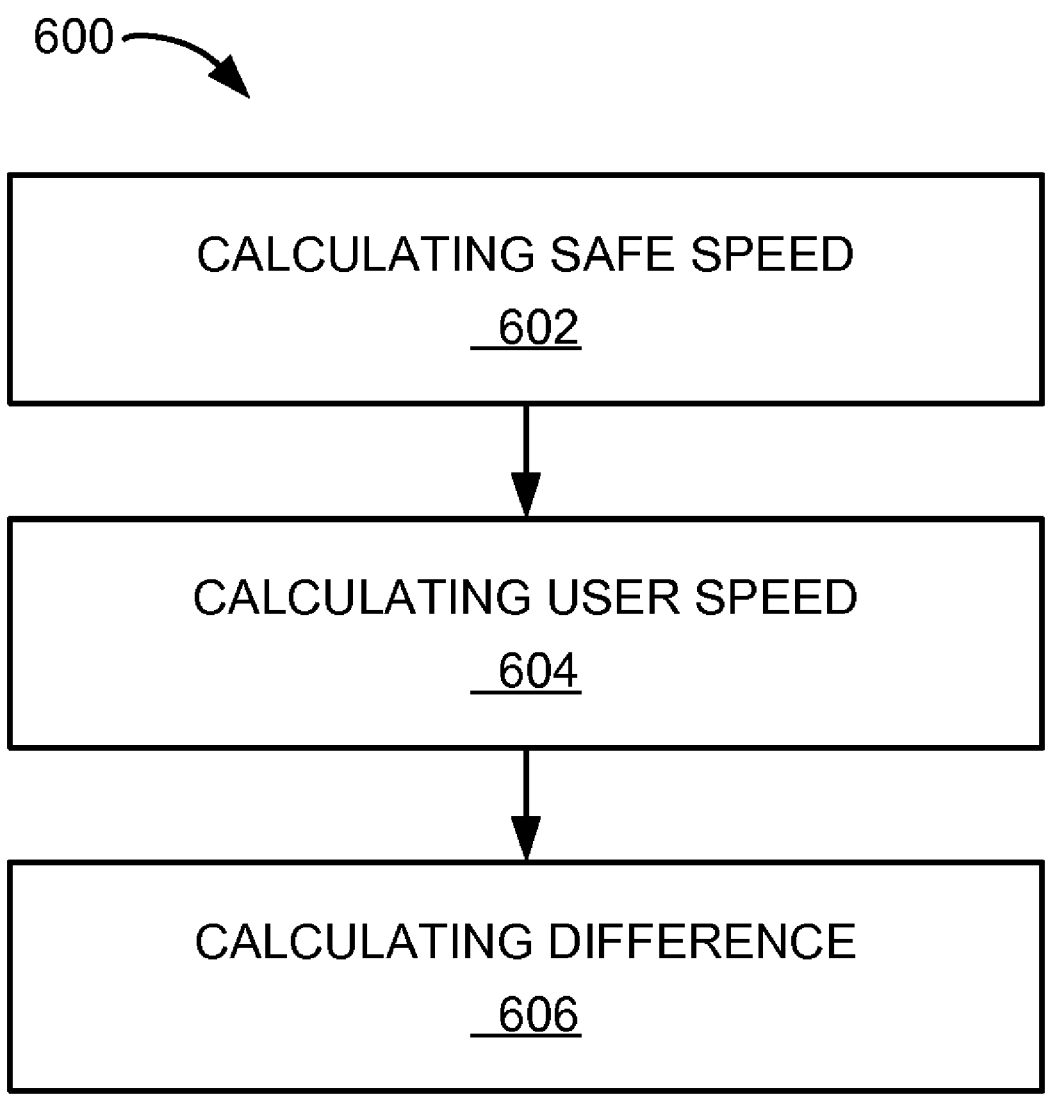
FIG. 6 is a flow chart of a method of operation of a navigation system in a further embodiment of the present invention.

Referring now to FIG. 6, therein is shown a flow chart of a method 600 of operation of a navigation system in a further embodiment of the present invention. The method 600 includes: calculating a safe speed for a travel path in a block 602; calculating a user's speed along the travel path in a block 604; and calculating a difference value between the user's speed and safe speed for displaying on a device in a block 606.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization.

Another important aspect of the present invention is that it valuably supports and services the historical trend of reducing costs, simplifying systems, and increasing performance.

These and other valuable aspects of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A method of operation of a navigation system comprising:
    calculating a safe speed for a travel path;
    calculating a user's speed along the travel path;
    calculating a difference value between the user's speed and the safe speed for displaying on a device; and
    wherein calculating the difference value includes:
        selecting a user icon for representing the user's speed;
        selecting a virtual companion icon for representing the safe speed; and
        displaying the virtual companion icon relative to the user icon based on the difference value.

2. The method as claimed in claim 1 further comprising:
    setting a buffer zone around the safe speed; and
    changing a display for the difference value based on the user's speed outside the buffer zone.

3. The method as claimed in claim 1 further comprising generating an override speed for overriding the safe speed with a location condition from a sensor physically proximate to the device.

4. The method as claimed in claim 1 further comprising:
    generating an override speed for overriding the safe speed with the location condition from a sensor physically proximate to the device; and
    wherein calculating the difference value includes:
        selecting the safe speed or the override speed, whichever is lower; and
        subtracting the user's speed from the safe speed or the override speed, whichever is lower.

5. A method of operation of a navigation system comprising:
    calculating a safe speed along a travel path;
    calculating a user's speed along the travel path;
    setting a buffer zone around the safe speed;
    changing a display for a difference value based on the user's speed outside the buffer zone;
    generating an override speed with a location condition from a sensor physically proximate to a device;
    overriding the safe speed with the override speed;
    calculating the difference value between the safe speed or the override speed and the user's speed for displaying on the device; and
    wherein calculating the difference value includes:
        selecting a user icon for representing the user's speed;
        selecting a virtual companion icon for representing the safe speed; and
        displaying the virtual companion icon relative to the user icon based on the difference value.

6. The method as claimed in claim 5 wherein calculating the safe speed for the travel path includes:
    setting the safe speed to a speed limit;
    setting a lower bound of the safe speed; and
    lowering the safe speed below the speed limit along the travel path while not going lower than the lower bound of the safe speed.

7. The method claimed as in claim 5 wherein setting the buffer zone around the safe speed includes:
    downloading an accident indicator;
    downloading a traffic condition; and
    setting a lower bound of the safe speed to minimize the risk of an accident based on the accident indicator and the traffic condition.

8. The method as claimed in claim 5 wherein calculating the difference value includes:
    selecting the safe speed or the override speed, whichever is lower; and
    subtracting the user's speed from the safe speed or the override speed, whichever is lower.

9. The method as claimed in claim 5 wherein calculating the difference value between the safe speed or the override speed and the user's speed for displaying on the device includes:
    depicting a bar graph for the safe speed or the override speed;
    depicting the user's speed on the bar graph;
    depicting the buffer zone on the bar graph; and
    displaying the difference value on the bar graph with the relative positions of the safe speed or the override speed and the user's speed.

10. A navigation system comprising:
    a safe speed module for calculating a safe speed for a travel path;
    a user's speed module, coupled to the safe speed module, for calculating a user's speed along the travel path;
    a difference module, coupled to the safe speed module, for calculating a difference value between the safe speed and the user's speed;
    a display module, coupled to the difference module, for:
        depicting the difference value,
        selecting a user icon for representing the user's speed,
        selecting a virtual companion icon for representing the safe speed, and
    a display interface, coupled to the display module, for displaying the virtual companion icon relative to the user icon based on the difference value.

11. The system as claimed in claim 10 wherein the display module for setting a buffer zone around the safe speed and for changing a display for the difference value based on the user's speed outside the buffer zone.

12. The system as claimed in claim 10 further comprising an override module, coupled to the safe speed module, for generating an override speed for overriding the safe speed with a location condition from a sensor physically proximate to the device.

13. The system as claimed in claim 10 further comprising:
    an override module, coupled to the safe speed module, generating an override speed for overriding the safe speed with the location condition from a sensor physically proximate to the device; and wherein:
   the difference module is for calculating the difference value by selecting the safe speed or the override speed, whichever is lower, and for subtracting the user's speed from the safe speed or the override speed, whichever is lower.

14. The system as claimed in claim 10 wherein:
   the display module is for setting a buffer zone around the safe speed and changing a display for the difference value based on the user's speed outside the buffer zone; and
further comprising:
   an override module is for generating an override speed with a location condition from a sensor physically proximate to a device and overriding the safe speed with the override speed.

15. The system as claimed in claim 14 wherein the safe speed module for setting the safe speed to a speed limit, setting a lower bound of the safe speed, and lowering the safe speed below the speed limit along the travel path while not going lower than the lower bound of the safe speed.

16. The system as claimed in claim 14 further comprising:
   a control unit for downloading an accident indicator and for downloading the traffic condition; and
wherein:
   the safe speed module is for setting a lower bound of the safe speed to minimize the risk of an accident based on the accident indicator and the traffic condition.

17. The system as claimed in claim 14 wherein the difference module is for selecting the safe speed or the override speed, whichever is lower, and for subtracting the user's speed from the safe speed or the override speed, whichever is lower.

18. The system as claimed in claim 14 wherein:
   the display module is for depicting a bar graph for the safe speed or the override speed, for depicting the user's speed on the bar graph, for depicting the buffer zone on the bar graph; and
   the display interface is for displaying the difference value on the bar graph with the relative positions of the safe speed or the override speed and the user's speed.

* * * * *